United States Patent [19]

Klug

[11] Patent Number: 4,722,499
[45] Date of Patent: Feb. 2, 1988

[54] AUXILIARY WING TIPS FOR AN AIRCRAFT

[75] Inventor: Heinz G. Klug, Buxtehude, Fed. Rep. of Germany

[73] Assignee: Messerschmitt-Boelkow-Blohm Gesellschaft mit beschraenkter Haftung, Munich, Fed. Rep. of Germany

[21] Appl. No.: 839,431

[22] Filed: Mar. 13, 1986

Related U.S. Application Data

[63] Continuation-in-part of Ser. No. 549,330, Nov. 7, 1983, abandoned.

[30] Foreign Application Priority Data

Nov. 18, 1982 [DE] Fed. Rep. of Germany ....... 3242584

[51] Int. Cl.$^4$ ............................................... B64C 5/08
[52] U.S. Cl. .................................... 244/199; 244/91; 244/45 R
[58] Field of Search ............. 244/75 R, 91, 199, 90 R, 244/45 R, 218

[56] References Cited

U.S. PATENT DOCUMENTS 2,537,369  1/1951  Ostroff ................................ 244/218
4,455,004  6/1984  Whitaker, Sr. ................... 244/90 R

FOREIGN PATENT DOCUMENTS 2149956  4/1973  Fed. Rep. of Germany ........ 244/91

Primary Examiner—Joseph F. Peters, Jr.
Assistant Examiner—Rodney Corl
Attorney, Agent, or Firm—W. G. Fasse; D. H. Kane, Jr.

[57] ABSTRACT

Auxiliary winglets or control surfaces for aircraft wings are tiltable about an axis extending in the flight direction and about an axis extending substantially perpendicularly to the flight direction. The auxiliary wing tips have a configuration which assure a wing surface continuity, especially when the tips are in their normal wing extending position, but also in any other position of the winglets. Additionally, at least the leading auxiliary winglets are located upstream of the elastic wing axis, as viewed in the flight direction and they have a forward sweep or negative sweepback. The combination of these features permits a simultaneous reduction of induced drag and of stress caused by wind gusts, and for increasing the effectiveness of the wing's ailerons. Thus, these auxiliary winglets have three advantages simultaneously.

9 Claims, 11 Drawing Figures

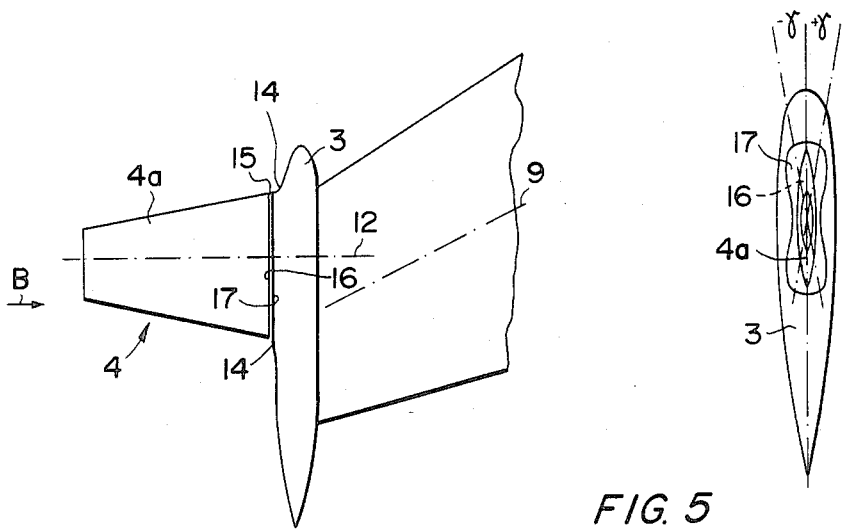
FIG. 4
FIG. 5
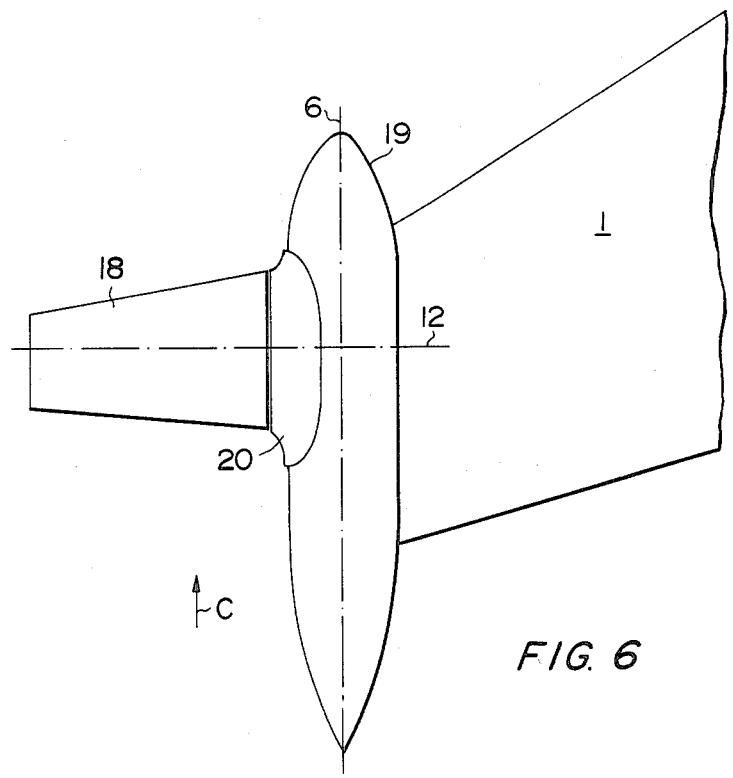
FIG. 6

AUXILIARY WING TIPS FOR AN AIRCRAFT

CROSS-REFERENCE TO RELATED APPLICATION

The present application is a continuation-in-part application of my copending U.S. Ser. No. 549,330, filed on Nov. 7, 1983, now abandoned.

FIELD OF THE INVENTION

The invention relates to an arrangement of auxiliary control surfaces at the wing tips of an aircraft.

DESCRIPTION OF THE PRIOR ART

Such auxiliary control surfaces are used generally for the purpose of advantageously influencing the tip vortex occurring at the wing tips. Such advantageous influence helps reducing the so-called induced drag which in turn has an advantageous influence on the fuel consumption of an aircraft during cruising flight.

An arrangement of such auxiliary control surfaces is disclosed, for example, in German Patent Publication No. DE-OS 2,149,956, illustrating a high lift wing, the tip of which comprises several partial winglets. These winglets are tiltable about an axis extending in the direction of the longitudinal axis of the aircraft. In one construction according to German Patent Publication No. 2,149,956, the winglets extend in a fan shaped arrangement when the winglets are tilted into an operative position, whereby the leading winglet is tilted furthest upwardly and the trailing winglet is tilted furthest downwardly. This type of construction is capable of reducing the induced drag. However, this prior art construction is not capable of reducing loads caused by wind gusts.

Another construction capable of reducing loads caused by wind gusts is disclosed in U.S. Pat. No. 4,455,004. According to this prior art construction, each wing tip carries an aerodynamically shaped boom to which there is attached a movable control surface in such a position that the movable control surface is located upstream of the elastic wing axis. When a load caused by a wind gust occurs, the winglet is immediately deflected for causing a counter force acting against the force caused by the wind gusts. This type of construction is also used for improving the effectiveness of conventional ailerons. Such additional features for increasing the effectiveness of the ailerons are necessary because the effectiveness of the ailerons generally decreases as the flight speed increases. The conventional reduction in the effectiveness of an aileron is due to the fact that the force of a tilted aileron imparts a torsion force to the wing, whereby the effectiveness of an aileron is due to the fact that the force of change in the angle of attack resulting from the torsion load. According to U.S. Pat. No. 4,455,004 the winglet control surface provided for this purpose is tilted simultaneously with the tilting of the aileron so that the resulting additional control force is effective in the same direction as the aileron caused force. In this prior art structure the aerodynamically shaped boom acts as a lever arm on which the force of the winglet control surface is effective at a point relatively far ahead of the elastic wing axis. As a result, a torsion moment is applied to the wing which counteracts the torsion moment caused by the aileron. In this manner it is possible to again eliminate the disadvantageous change in the angle of attack of the wing caused by the aileron tilting.

Although the structure according to U.S. Pat. No. 4,455,004 achieves an effective reduction of wind gust caused loads, and an increase in the aileron effectiveness, it has the disadvantage that it is not suitable for reducing the induced drag. This is due to the fact that the boom, which as such has a rotational symmetry, does not constitute any substantial hindrance to an edge or tip vortex, and due to the further fact that the winglet control surfaces constitute separate aerodynamic elements due to their forward position relative to the elastic wing axis. As a result, these winglet control surfaces generate a pair of vortexes in a first approximation when positive or negative lift is produced. The effect of the vortex pair is as such neutral relative to a tip or edge vortex.

OBJECTS OF THE INVENTION

In view of the foregoing it is the aim of the invention to achieve the following objects singly or in combination:

to construct auxiliary control surfaces at the tips of an aircraft wing in such a manner that the auxiliary control surfaces simultaneously serve for reducing loads or stress caused by wind gusts and for increasing the aileron effectiveness while additionally and simultaneously reducing the induced drag;

to provide the outer ends or tips of aircraft wings with additional or auxiliary surfaces which are effective for induced drag reduction under many different flight conditions. and not as the result of weight reduction;

to construct these auxiliary wing tip surfaces in such a manner, that they may be used as ailerons and also for the purpose of reducing loads or stress in the wings caused by wind gusts; and to avoid the above mentioned aeroelastic effect on the wings of an aircraft or better yet, use it effectively.

SUMMARY OF THE INVENTION

According to the invention there is provided an aircraft wing construction with auxiliary wing tip surfaces extending substantially perpendicularly to the flight direction. These auxiliary wing tip surfaces are tiltable at least about one axis extending substantially perpendicularly to the flight direction, whereby the tilting is effected by a motor of a first kind. The auxiliary wing tip surface has a substantial surface continuity with its respective aircraft wing so that the wing tip configuration merges into the respective outer wing end when the auxiliary wing tip surfaces are in any position relative to the wing. At least one auxiliary wing tip surface is located upstream of the elastic wing axis. Additionally, the auxiliary wing tips have a forward sweep or a negative sweepback relative to the elastic wing axis so that the auxiliary surfaces are usable simultaneously for a load reduction caused by wind gusts and for reducing the induced drag. The present surfaces also improve the aileron effectiveness. According to the invention at least one, preferably two auxiliary wing tip surfaces are movably secured directly to the outer ends of the aircraft wings. These auxiliary wing tips extend in the direction of the span width and, if two auxiliary wing tip surfaces are used, they are arranged alongside each other. Control means of conventional construction are connected to the hinged auxiliary wing tip surfaces for deflecting these wing tip surfaces either entirely or for deflecting a portion of the wing tip surfaces to vary their effectiveness under different flight conditions. Preferably, the hinging axis of the auxiliary wing tip surfaces extends in the plane of a wing chord.

The auxiliary wing tips according to the invention have several advantages. Since the auxiliary wing tips are adjustable in their position relative to the wing, they can be so positioned, in accordance with the instantaneous flight condition, that they cause an optimal reduction of the induced drag at the aircraft wing. Further, since at least one additional or auxiliary wing tip surface is arranged upstream of the elastic wing axis, an amplifying aeroelastic effect is achieved in response to adjustment of said auxiliary wing tip surface. As a result, such deflection of the auxiliary wing tip surface is very effective even at high dynamic pressures in the sense of an aileron effect as well as in the sense of a wind gust stress reduction when both auxiliary wing tip surfaces are deflected in the same direction. A further amplifying effect can be achieved if one or several auxiliary wing tip surfaces are rotated together while simultaneously deflecting trailing edge flaps hinged to the trailing edge of the auxiliary wing tip or tips. Aircraft wings equipped, according to the invention, with auxiliary wing tip surfaces further achieve the advantages of a larger aspect ratio relative to the reduction of the induced drag without causing any additional substantial stress of the wings as a result of the mass of these auxiliary wing tip surfaces.

BRIEF DESCRIPTION OF THE DRAWINGS

In order that the invention may be clearly understood, it will now be described, by way of example, with reference to the accompanying drawings, wherein:

FIG. 4 shows a detail of an auxiliary wing tip surface having an aerodynamic housing or fairing;

FIG. 5 is a view in the direction of the arrow B in FIG. 4;

FIG. 6 is a view similar to that of FIGS. 1 and 3, showing an aerodynamic boom at the wing tip end and carrying an auxiliary winglet or surface with a movable, aerodynamic fairing merging the winglet into the boom;

DETAILED DESCRIPTION OF PREFERRED EXAMPLE EMBODIMENTS AND OF THE BEST MODE OF THE INVENTION

Figure 1:
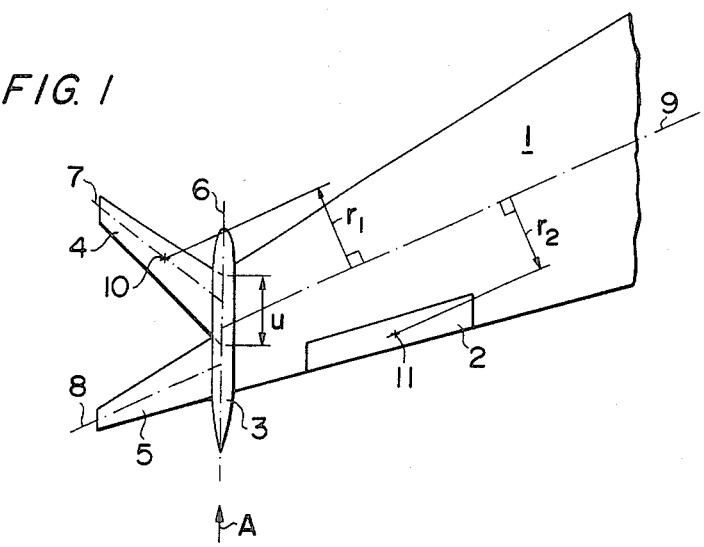
FIG. 1 is a top plan view of a wing according to the invention showing the distinct forward sweep of at least one of the auxiliary winglet or control surfaces which are tiltable at least on an axis extending in parallel to the longitudinal aircraft axis and thus in the flight direction.

FIG. 1 shows the plan view of an aircraft wing 1 having an aileron 2 at its trailing edge and an aerodynamically shaped boom 3 at its wing tip. Two winglets 4 and 5, forming auxiliary control surfaces, are operatively secured to the boom 3 in such a way that each winglet 4, 5 is tiltable about the longitudinal axis 6 of the boom 3 extending in the flight direction in parallel to the longitudinal aircraft axis, and also about the respective individual axis 7 or 8. Additionally, the winglet is tiltable about its own longitudinal axis 7, whereas the winglet 5 is tiltable about its own longitudinal axis 8. The leading or front auxiliary control surface or winglet 4 is located substantially upstream or ahead of the elastic wing axis 9 of the wing 1. The winglet 4 has a distinct forward sweep so that the pressure center 10 of the winglet 4 is spaced by the distance r1 from the elastic wing axis 9. The distance r1 is measured in a direction extending at a right angle on the elastic axis 9. This distance r1 increases with the increasing of the forward sweep of the winglet or control surface 4.

The pressure center 11 of the aileron 2 is spaced from the elastic wing axis 9 by the spacing r2. Due to the forward sweep of the winglet 4 it is made sure that the winglet 4 is located sufficiently ahead of the elastic wing axis 9 so that the efficiency or effectiveness of the aileron 2 is increased. Additionally, the fairing or skin of the winglet 4 merges into the fairing or skin of the aerodynamic boom 3 along the length u to provide a surface continuity between the main wing 1 and the winglet 4, whereby an effective reduction of the induced drag is achieved. The length u indicates the extent of the overlap between the wing 1 and the winglet 4 along the axis 6 of the boom 3.

Figure 2:
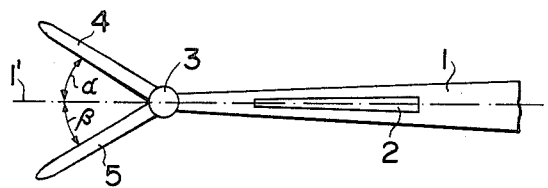
FIG. 2 is a view in the direction of the arrow A in FIG. 1.

FIG. 2 is a view in the direction of the arrow A as shown in FIG. 1 toward the trailing edge of the wing and winglets. In this preferred embodiment the leading winglet 4 forms an angle α with the plane 1' of the wing 1 when the winglet 4 is deflected upwardly. The winglet 5 also forms an angle β with the plane 1' of the wing 1 when the winglet 5 is deflected downwardly. The deflection of the winglets 4 and 5 and the values for the angles α and β may be adjusted so that during cruising flight the induced drag is at a minimum.

If loads caused by wind gusts occur, or when the aileron 2 is deflected, the winglets 4 and 5 are instantaneously tilted in such a manner that the respective additional loads or forces effective on the wing 1 are reduced. For this purpose sensors are provided which generate with the aid of logic circuits control signals with sufficient speed for controlling the respective drive means of the winglets 4 and 5 as will be described in more detail below, especially with reference to FIG. 11.

A modification of the invention comprises keeping the winglets 4 and 5 stationary relative to the axis 7 at the angles α and β as shown in FIG. 2, however permitting the rotation of the winglets 4 and 5 about their respective own longitudinal axes 7 and 8.

Figure 3:
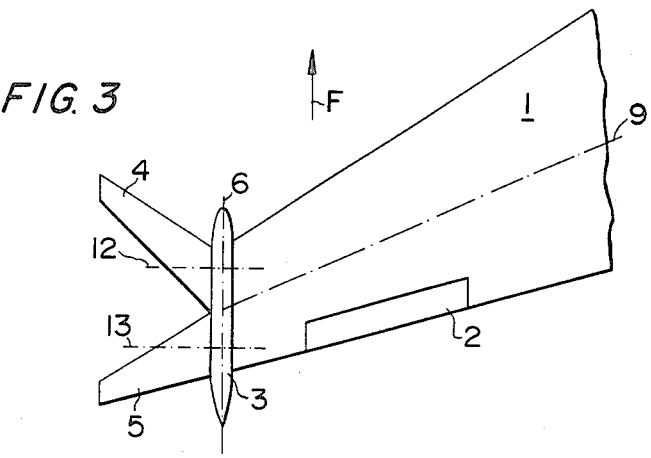
FIG. 3 is a view similar to that of FIG. 1, whereby the auxiliary winglets or control surfaces are also tiltable about respective axes extending perpendicularly to the longitudinal aircraft axis and thus across the flight direction.

FIG. 3 shows an embodiment in which the winglets 4 and 5 are rotatable about axes 12 and 13 respectively in addition to the rotation about the axis 6. Making the winglets 4 and 5 rotatable about the respective axes 12 and 13 has the advantage that the gaps between the winglets 4 and 5 and the aerodynamic boom 3 can be closed more effectively by an aerodynamic fairing. This is important, especially when the winglets 4 and 5 are in a position tilted relative to the air flow direction in order to avoid aerodynamic losses.

FIGS. 4 and 5 illustrate such a fairing 14 for a winglet 4a. In absolute terms the forward sweep of the winglet 4a in FIG. 4 is somewhat smaller than the forward sweep of the winglet 4 in FIG. 1. However, even in FIG. 4 the winglet 4a still has a lever arm which is quite effective relative to the elastic axis 9. The interface between the winglet 4a and the boom 3 is formed by a gap 15. The gap may be a narrow air gap between two surfaces or the two surfaces contact each other at the interface. In both instances the end surface 16 of the winglet 4a faces a flat surface 17 of the boom 3. If no air gap is formed, that is, if the surfaces 16 and 17 contact each other, such contact is an elastic contact. The fairing 14 itself provides the transition from the flat surface 17 to the boom 3. FIG. 5 shows the winglet 4a and the boom 3 as viewed in the direction of the arrow B in FIG. 4 extending in parallel to the longitudinal axis 12 of the winglet or control surface 4a. The body surface 17 of the boom 3 is so shaped and dimensioned that the winglet 4a and thereby its surface 16 can be tilted in an angular range of $+\gamma$ to $-\gamma$ about the axis 12, without the danger that the end surface 16 of the winglet 4a would project outside the surface 17 of the boom 3 at any position within said angular range which is so selected that the angular adjustment of the winglet 4 needed for minimizing the induced drag during cruising flight, falls into this range of $+\gamma$ to $-\gamma$.

For compensating loads or stresses caused by wind gusts and for increasing the effectiveness of the ailerons, the angle $\gamma$ may also be selected to be larger than explained above, whereby higher aerodynamic losses have to be taken into account. However, these aerodynamic losses are of such a short duration that they may be disregarded for all practical purposes.

FIG. 4 only shows the forward winglet 4a. However, the aerodynamic transition or interface between the boom 3 and a further rearward winglet as winglet 5 in FIG. 3, in the same manner as described above with reference to the fairing 14 of the winglet 4a.

Figure 7:
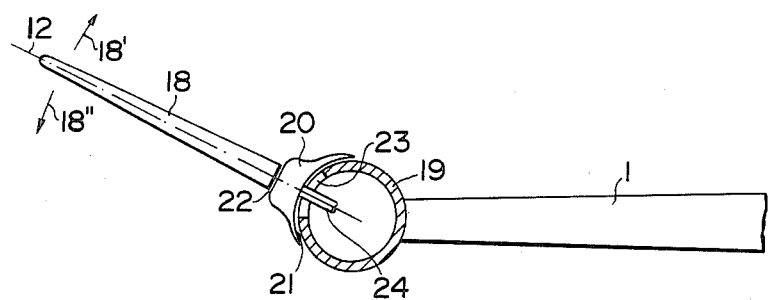
FIG. 7 is a view, partially in section, in the direction of the arrow C in FIG. 6.

FIGS. 6 and 7 show an embodiment of an auxiliary control surface 18 which is tiltable up and down in the direction of the arrows 18' and 18". A boom 19 having an aerodyamic configuration is rigidly secured to the tip end of the wing 1. The boom 19 comprises a transition member 20 which is tiltable about the axis 6 as will be described below. The transition member 20 has a substantially cylindrical surface portion 21 in sliding contact with the respective surface of the body 19. The transition member 20 further has a substantially plane surface 22 in contact with the fairing of the auxiliary control surface 18. The plane surface 22 corresponds basically with the surface 17 according to FIG. 5. Thus, the winglet or auxiliary control surface 18 can be tilted about the axis 6 as well as about the axis 12, whereby aerodynamic losses are substantially avoided.

FIG. 7 shows the embodiment of FIG. 6 as viewed in the direction of the arrow C, whereby the boom 19 is shown in section with the section plane extending substantially along the axis 12. In order to tilt the winglet 18 up or down, the boom 19 is provided with a slot 23 for a shaft 24 which is driven about the axis 12 for rotating the winglet 18 about the axis 12. Additionally, the shaft 24 is rotated about the axis 6 to tilt the winglet 18 up or down as indicated by the arrows 18', 18".

Figure 8:
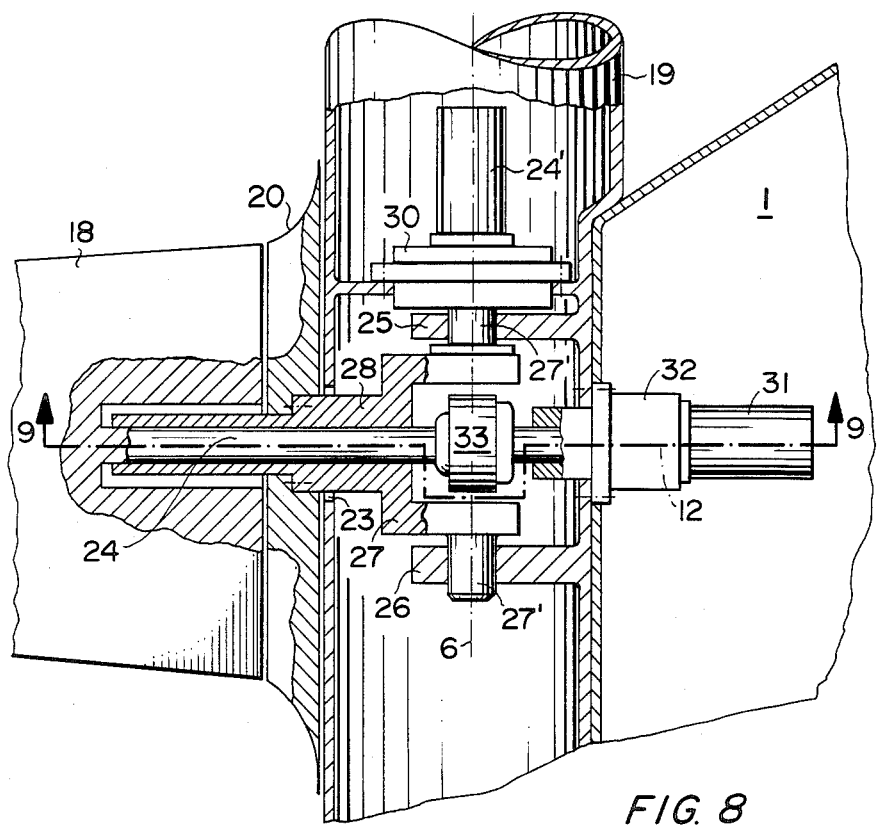
FIG. 8 is a top plan view, partially in section, of the drive means for an auxiliary winglet or control surface, including a synchronizing universal joint.
Figure 9:
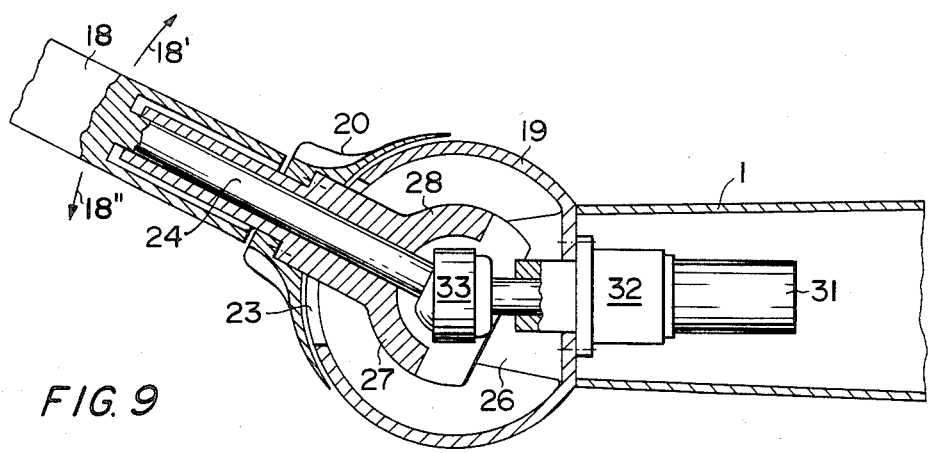
FIG. 9 is a sectional view along section line 9—9 in FIG. 1.

FIGS. 8 and 9 illustrate a preferred arrangement of the support and drive structure for the moving components illustrated in FIGS. 6 and 7. The aerodynamically shaped boom 19 is rigidly secured to the outer end of the wing 1. The boom 19 carries two bearing brackets 25 and 26 for supporting an intermediate bearing housing 27 for the drive shaft 6. The housing 27 has bearing studs 27' tiltably supported in the brackets 25, 26 so that the housing 27 is tiltable about the axis 6. Further, the housing 27 comprises a bearing bushing 28 for the shaft 24. The bearing bushing 28 has a size which permits the sliding of the bushing 28 in the slot 23 of the boom 19 to permit the up and down tilting of the winglet 18 as indicated by the arrows 18' and 18". A first drive motor 31 is mounted in the wing 1 and drives through a gear train 32 and through a synchronous coupling joint 33 the shaft 24 for rotation about the axis 12. Synchroneous coupling joints such as shown at 33 are known as such and are used, for example, for driving steerable vehicle wheels. A second drive motor 21 drives through a gear train 30 the housing 27 for tilting about the axis 6. Both drive motors 31 and 24' are rigidly mounted in place so that movable conductors to the motors are avoided.

Figure 10:
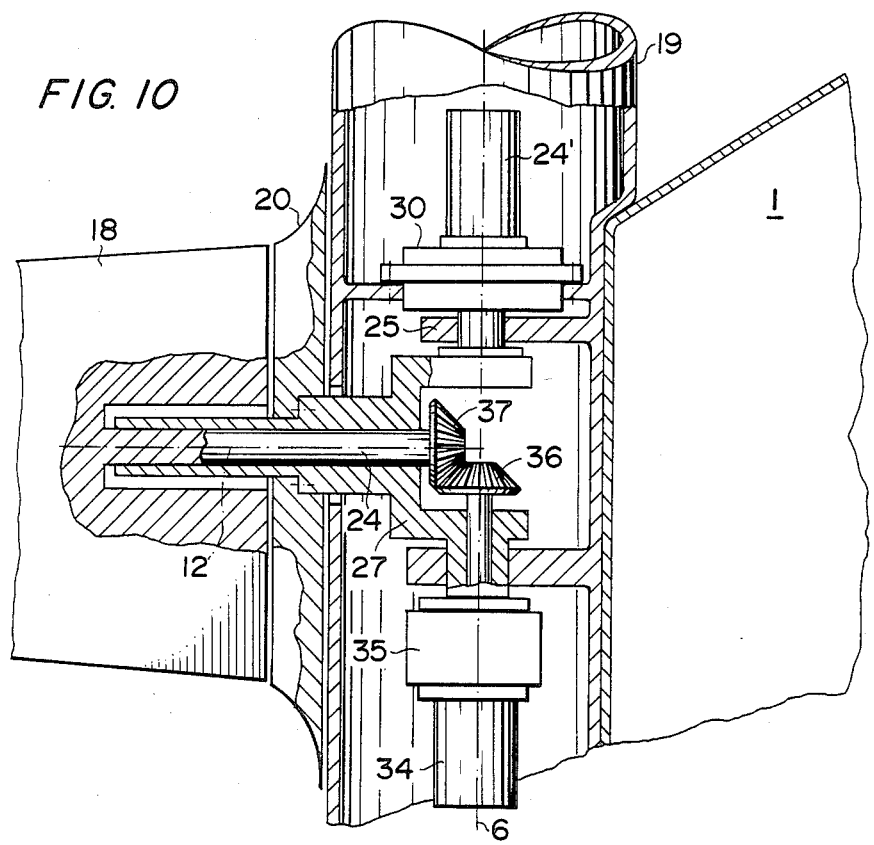
FIG. 10 is a view similar to that of FIG. 8, showing a modified synchronizing universal joint with several gear wheels.

FIG. 10 shows a further embodiment in which a motor 34 drives the shaft 24 through a gear train 35 and through bevel gear wheels 36 and 37. These bevel gear wheels 36, 37 are located in the housing 27 for tilting the winglet 18 about the axis 12. The tilting of the housing 27 about the axis 6 is accomplished by the motor 24' through the gear train 30 as described above. In the embodiment of FIG. 10, both motors 24' and 34 are mounted in the boom 19.

Figure 11:
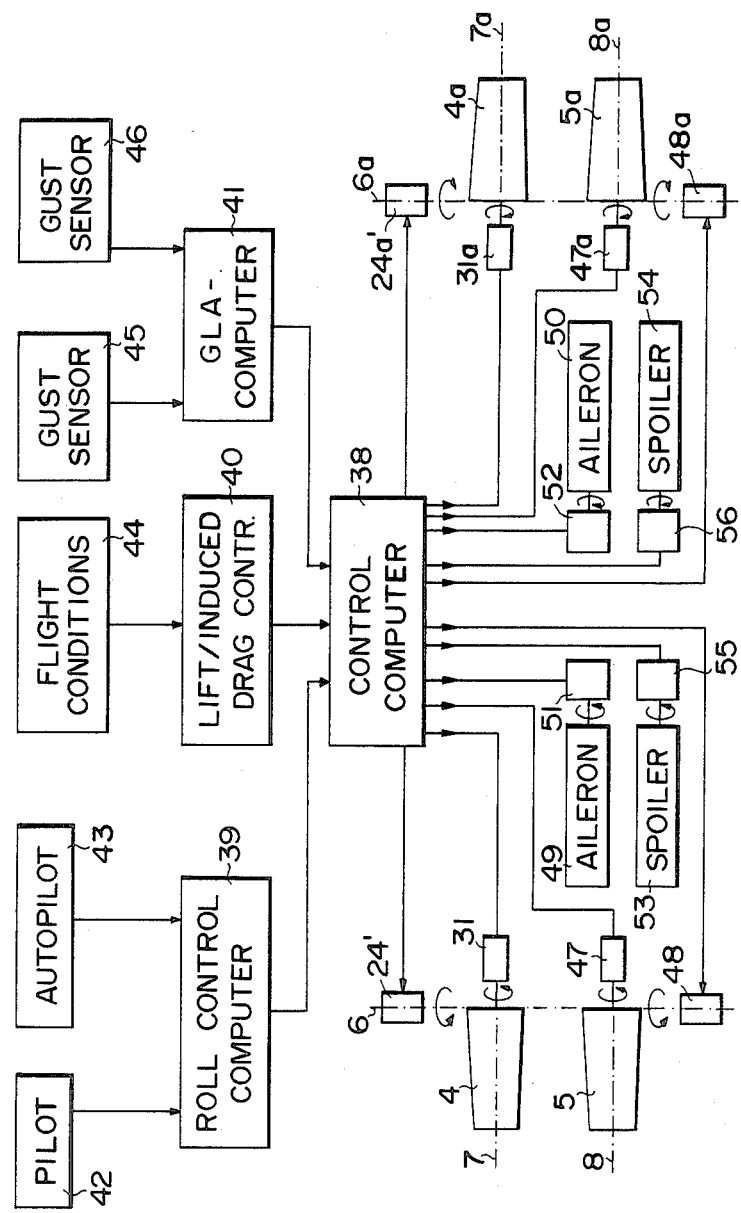
FIG. 11 is a block circuit diagram of a control system for the auxiliary winglet or control surfaces according to the invention.

The control system shown in FIG. 11 for controlling the auxiliary winglets or control surfaces comprises substantially a control computer 38, which cooperates with a rolling control computer 39, with a lift computer 40, and with a computer 41 for reducing wind gust caused loads or stress. Auxiliary winglets 4 and 5 as described above, are mounted to the tip of the left wing of an aircraft. The left wing is also equipped with an aileron 49 and a spoiler 53. The aileron is driven by a drive motor 51. The spoiler is driven by a drive motor 55. The right wing structure is symmetric to the left wing structure and the respective reference numbers are provided with the letter "a", except that the right aileron 50 is driven by the drive motor 52 and the right spoiler 54 is driven by the motor 56. The first drive means for rotating the respective winglet 4 and 5 about the respective axes 7 and 8 comprise the drive motors 31 and 47. The second drive means for rotating the winglets 4 and 5 about the axis 6 comprise the drive motors 24' and 48 respectively. The same arrangement is provided for the right-hand wing. Thus, the first drive means 31a and 47a drive the winglets 4a and 5a about the respective axes 7a and 8a. The second motors 24a' and 48a drive the winglets 4a, 5a about the axis 6a.

All the motors are controlled by output signals from the control computer 38 which receives input signals from the rolling control computer 39, the lift and induced drag control computer 40, and from the gust load alleviation computer 41. The rolling control computer receives input signals from the pilot 42 or from the autopilot 43. The lift control computer 40 receives an input from flight condition sensors 44. The gust load alleviation computer 41 receives inputs from gust sensors 45 and 46. FIG. 11 only shows those rudders of the aircraft which have an influence on the aircraft movement around the roll axis. Accordingly, other control surfaces such as the elevator and lateral rudder and their control means are not shown here since they are not relevant to the claimed invention.

The system shown in FIG. 11 permits performing the following three functions.

First, reference is made to causing a rolling motion of the aircraft. For this purpose a signal from the pilot 42 or from the autopilot 43 is supplied to the rolling computer 38 which provides a respective output signal to the control computer 39 which in turn controls the operation of the motors 51 and 52 for the operation of the ailerons 49 and 50. Simultaneously, the motors 31, 31a and 47, 47a are also controlled by the control computer 38 in coordination with the operation of the ailerons, whereby the effectiveness of the ailerons is increased.

Second, reference is made to minimizing the induced drag. For this purpose the lift drag computer 40 provides output signals to the control computer 38 in response to flight condition signals provided by the flight condition sensors 44 which sense instantaneous flight data, especially the speed and the location of the center of gravity. The lift drag computer calculates, from these input signals, the most advantageous optimal lift distribution. The resulting output signals from the lift drag computer 40 are used by the control computer 38 for providing respective control signals to the motors 24', 24a' and 48, 48a in such a manner that the calculated optimal lift distribution is achieved. As a result, the induced drag also has momentarily its lowest value. This operation as just described in continuously repeated. Therefore, the entire flight takes place at the minimal induced drag for all practical purposes. Under extreme operating conditions the motors 31, 31a and 47, 47a are also energized in response to output signals from the computers 39 and 40 are heterodyned or superimposed on one another so that the auxiliary winglets 4, 4a and 5, 5a again assume their position as determined by the computer 40 after a rolling motion of the aircraft has been performed. Third, reference is made to the reduction of wind gust caused loads or stress. When a wind gust occurs, the left-hand sensor 45 and/or the right-hand sensor 46 provides a respective signal to the gust load alleviating computer 41. This gust load alleviating computer 41 calculates on the basis of the received input signal instantaneously the deflections which are necessary for reducing the respective wind gust caused load by deflecting the corresponding auxiliary winglets 4, 4a and 5, 5a. Thus, the control computer 38 instantly causes the energizing of the motors 31, 31a, and 47, 47a. The signals coming from the left-hand sensor 45 cause an operation of the left motors 31 and 47. The signals coming from the right-hand sensor 46 cause an energization of the motors 31a and 47a. As a result, a wind gust effective on the wing 1 is effectively reduced. The sensors 45 and 46 are responsive in the vertical direction and can be realized by conventional acceleration sensors. The computer 38 is again so programmed that the signals from the gust load alleviating computer 41 are heterodyned or superimposed on the signals from the computers 39 and 40 in such a manner that the movements of the respective auxiliary winglets, or rather the deflections of these winglets, are proportional to the sum of the signals delivered by these three computers. Further, the computer 38 makes sure that preprogrammed priorities or permissible maximum values, are maintained or taken into account.

Although the invention has been described with reference to specific example embodiments, it will be appreciated, that it is intended to cover all modifications and equivalents within the scope of the appended claims.

What I claim is:

1. An aircraft wing construction, comprising wings, each wing including a leading edge, a trailing edge, an elastic axis, an outer wing end, and auxiliary winglet means at said outer wing end, said auxiliary winglet means including first hinging means securing said auxiliary winglet means to said outer wing end, said first hinging means having a first hinging axis extending substantially perpendicularly to a flight direction, and first drive means arranged for tilting said auxiliary winglet means about said first hinging axis of said first hinging means, said winglet means comprising such a configuration that the winglet means merge into the respective outer wing end as an integral aerodynamic surface continuity of said outer wing end substantially in any position of said auxiliary winglet means relative to said outer wing end, said auxiliary winglet means comprising for each outer wing end at least one winglet located upstream of said elastic axis of the respective wing yet maintaining said integral aerodynamic surface continuity, said auxiliary winglet configuration having a forward sweep relative to said elastic axis, whereby said auxiliary winglet configuration simultaneously reduces stress caused by wind gust loads, directly reduces induced drag, and increases the effectiveness of an aileron.

2. The aircraft wing construction of claim 1, wherein each of said auxiliary winglet configurations comprises a plurality of auxiliary winglets, at least one winglet in each winglet configuration having said forward sweep.

3. The aircraft wing construction of claim 2, wherein said plurality of auxiliary winglets are located in a fan type arrangement.

4. The aircraft wing construction of claim 1, further comprising second hinging means having a second hinging axis extending substantially in said flight direction, and second drive means arranged for tilting said auxiliary winglet means about said second hinging axis of said second hinging means through a predetermined angular range about said second hinging axis.

5. The aircraft wing construction of claim 4, wherein said first drive means comprise a shaft and an intermediate housing, first means mounting said shaft for rotation in said intermediate housing about said first hinging axis, and second means mounting said intermediate housing for tilting said intermediate housing about said second hinging axis extending substantially in said flight direction.

6. The aircraft wing construction of claim 1, wherein said first drive means comprise mounting means for rigidly mounting said first drive means inside the respective wing, and synchronous coupling joint means for transmitting motion to the respective auxiliary winglet means.

7. The aircraft wing construction of claim 1, further comprising intermediate housing means having an aerodynamically shaped body mounted directly to said outer wing end, said first drive means comprising first motor means mounted in said intermediate housing means, and bevel gear means in said intermediate housing means for transmitting power from said first motor means to said auxiliary winglet means.

8. The aircraft wing construction of claim 4, further comprising main control computer means, roll control computer means connected to said main control computer means, lift computer means connected to said main control computer means, and stress computer means for reducing stress caused by wind gust, said stress computer means also being connected to said main computer means, said main computer means controlling said first and second drive means for optimally adjusting said auxiliary winglet means for said simultaneous reduction of wind gust caused stress, of said induced drag, and for increasing aileron effectiveness.

9. The aircraft wing construction of claim 1, wherein each of said wings has a back sweep, while said auxiliary winglet means have said forward sweep.

* * * * *